United States Patent
Yamakata et al.

(10) Patent No.: US 7,719,152 B2
(45) Date of Patent: May 18, 2010

(54) MAGNETIC LEVITATION ACTUATOR

(75) Inventors: Masaaki Yamakata, Akishima (JP);
Kiyoshi Akiyama, Akishima (JP)

(73) Assignee: Rigaku Corporation, Tokyo (JP)

( * ) Notice: Subject to any disclaimer, the term of this patent is extended or adjusted under 35 U.S.C. 154(b) by 303 days.

(21) Appl. No.: 11/886,555

(22) PCT Filed: Mar. 16, 2006

(86) PCT No.: PCT/JP2006/305756

§ 371 (c)(1),
(2), (4) Date: Sep. 17, 2007

(87) PCT Pub. No.: WO2006/098500

PCT Pub. Date: Sep. 21, 2006

(65) Prior Publication Data

US 2009/0033165 A1    Feb. 5, 2009

(30) Foreign Application Priority Data

Mar. 18, 2005    (JP) .............................. 2005-080719

(51) Int. Cl.
*H02K 7/09*    (2006.01)
(52) U.S. Cl. .................................................. 310/90.5
(58) Field of Classification Search ............... 310/90.5, 310/216.082, 216.091
See application file for complete search history.

(56) References Cited

U.S. PATENT DOCUMENTS 4,683,391 A * 7/1987 Higuchi ..................... 310/90.5
6,121,704 A * 9/2000 Fukuyama et al. ......... 310/90.5
2002/0117905 A1    8/2002 Toba

FOREIGN PATENT DOCUMENTS

| JP | 54-6445 | 1/1979 |
| JP | 64-24727 | 2/1989 |
| JP | 2-113118 | 4/1990 |
| JP | 02113118 | * 4/1990 |
| JP | 5-40621 | 6/1993 |
| JP | 10-288191 | 10/1998 |
| JP | 2001-263351 | 9/2001 |
| JP | 2002-330578 | 11/2002 |

OTHER PUBLICATIONS

Masaki Yamakata; "Development of Magnetic Levitation Actuator for Ultra High Vacuum", The 18th Symposium on Electromagnetics and Dynamics, May 2006.

* cited by examiner

*Primary Examiner*—Quyen Leung
*Assistant Examiner*—Leda Pham
(74) *Attorney, Agent, or Firm*—Jordan and Hamburg LLP

(57) ABSTRACT

A rotating shaft is accommodated in a case. A ferromagnetic portion is formed on the rotating shaft, and electromagnets are provided to the case. Many projecting portions are formed so as to be arranged in a direction along which the movement of the rotating shaft is required to be regulated. Furthermore, Many projecting portions are likewise formed on the ferromagnetic portion. According to this construction, magnetic flux occurring in the electromagnets concentrates, so that restoring force occurs in the axial direction with suppressing reduction of the attractive force in a radial direction to the ferromagnetic portion. Therefore, the movement in the axial direction of the rotating shaft can be regulated.

21 Claims, 12 Drawing Sheets

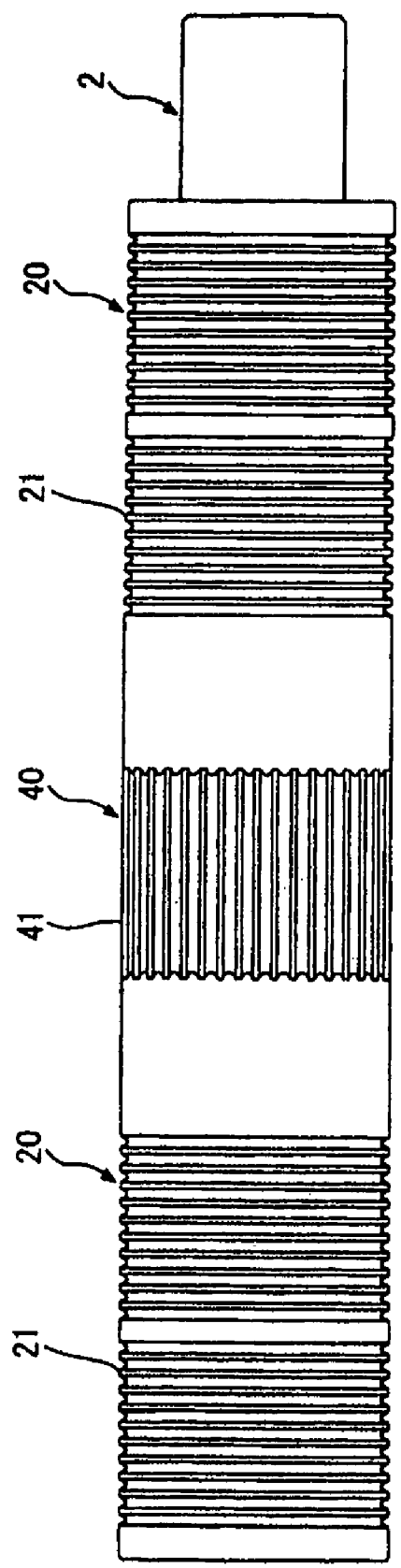

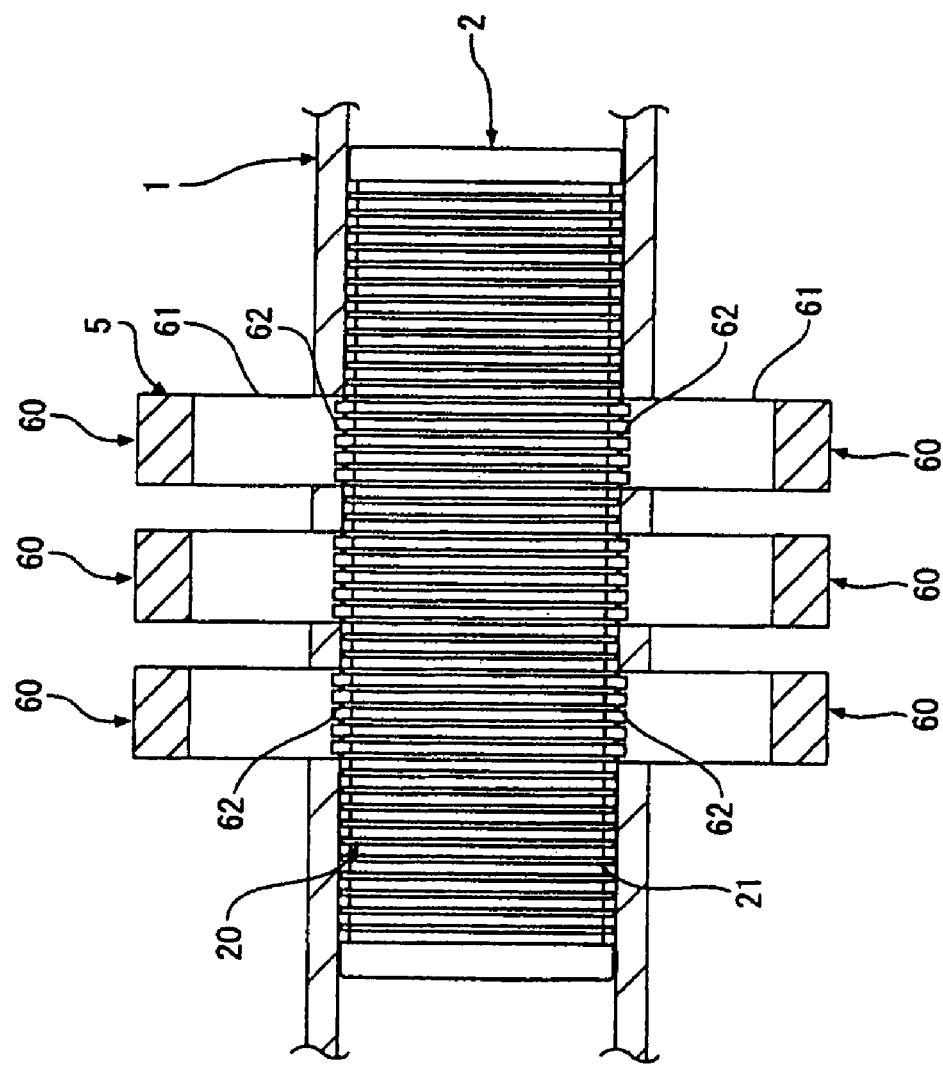

MAGNETIC LEVITATION ACTUATOR

TECHNICAL FIELD

The present invention relates to a magnetic levitation actuator having an electromagnet, and a ferromagnetic member provided so as to face the pole face of the electromagnet under a non-contact state, and more particularly to a magnetic levitation actuator suitable for a magnetic bearing, a linear motor, etc. which use the magnetic force of an electromagnet.

BACKGROUND ART

Many inventions relating to magnetic devices have been hitherto proposed. For example, JP-A-2001-263351 discloses the structure of a magnetic bearing for freely rotatably supporting a rotator by utilizing attractive force of an electromagnet.

DISCLOSURE OF THE INVENTION

Inventors have paid their attention to the shape of a pole face of an electromagnet for generating magnetic flux and dedicated to making keen studies thereon in consideration of the structure of conventional magnetic levitation actuators. Then, they have found a nonconventional peculiar effect by forming many projecting portions on each confronting face of the pole face of the electromagnet and a ferromagnetic member controlled by the electromagnet.

That is, according to the present invention, a magnetic levitation actuator having an electromagnet and a ferromagnetic member provided so as to face the pole face of the electromagnet under anon-contact state is characterized in that many projecting portions are formed on the respective confronting faces of the magnetic pole face of the electromagnet and the ferromagnetic member.

Specifically, in the magnetic levitation actuator in which a driven member is supported by the electromagnet and the ferromagnetic member under a noncontact state, the ferromagnetic member is provided to the driven member, and the many projecting portions are arranged in a direction along which the movement of the driven member is required to be regulated.

According to this construction, magnetic flux generated by the electromagnet is concentrated on the many projecting portions, and thus the positional resolution of attractive force or repulsive force to the confronting ferromagnetic member is enhanced, and the movement of the ferromagnetic member can be regulated with high precision.

In the above construction, each projecting portion is configured so that the cross-sectional area thereof is smaller toward the tip thereof.

The magnetic levitation actuator in which the driven member is driven under the non-contact state by the electromagnet and the ferromagnetic member may be configured so that the following first to third requirements are satisfied.

First, plural electromagnets are provided, and the respective electromagnets are arranged in a direction along which the driven member is required to be moved.

Secondly, the ferromagnetic member is provided to the driven member.

Thirdly, the pole faces of the plural electromagnets are displaced so that the phase of the projecting portions formed on the respective poles is returned to an original phase at any period.

According to the above construction, each electromagnet is controlled at a predetermined timing to move the magnetic field, whereby the direction of attractive force or repulsive force by the magnetic force to the ferromagnetic member is moved. Therefore, the driven member can be moved together with the ferromagnetic member. In this case, the magnetic flux occurring in the electromagnets concentrate the many projecting portions, and thus the positional resolution of the attractive force or repulsive force to the confronting ferromagnetic member is enhanced, so that the movement control of the ferromagnetic member can be performed with high precision.

In the above construction, it is preferable that each projecting portion is configured to have a rectangular longitudinal section.

Furthermore, in the magnetic levitation actuator in which the driving member is accommodated in a case, the electromagnet contains an iron core mounted on an outer portion of the case and a magnetic coil wound around the iron core, the end face of the iron core constitutes a pole face, the end face of the iron core concerned is formed of a non-laminated ferromagnetic member and the non-laminated ferromagnetic member is exposed to the inner surface of the case so as to serve as a part of the inner wall of the case.

For example, in the case of a magnetic device such as a vacuum motor or the like, it is required to keep the inside of the case under a high-vacuum environment. However, in conventional vacuum motors, a magnetic bearing is disposed in the case (for example, see JP-A-10-288191), and also a laminated steel plate is used for the iron core of an electromagnet constituting the motor. Therefore, it has been difficult to keep the inside of the case under a high-vacuum environment due to an effect of gas discharged from adhesive agent of resin sandwiched in the laminated steel plate.

Furthermore, when it is required to operate the vacuum motor under a high-temperature state, much gas is discharged from the adhesive agent of resin sandwiched in the laminated steel plate, and thus it has been more difficult to form a high-vacuum environment.

On the other hand, according to the above construction, the electromagnet is disposed at the outside of the case, and thus even when the iron core constituting the electromagnet is formed of a laminated steel plate, the inside of the case can be kept under a high-vacuum environment without being affected by discharged gas from the laminated steel plate.

However, when the stator is merely disposed at the outside of the case, the interval between the stator and the ferromagnetic member provided to the driven member is increased, and thus the magnetic force required to drive the driven member is weakened. Therefore, there is a risk that a sufficient torque cannot be achieved.

According to the above construction, at least the end face of the iron core constituting the magnetic pole is formed of a non-laminated ferromagnetic member, and the end face of the iron core is exposed to the inner surface of the case, whereby the interval between the iron core and the ferromagnetic member provided to the driven member is narrowed. Accordingly, strong magnetic force can be achieved, and the driven member can be driven with a sufficiently large torque. The end face of the iron core is formed of the non-laminated ferromagnetic member, and thus even when the end face of the iron core is exposed to the inner surface of the case, no gas is discharged from the site concerned. In addition, the iron core formed of the non-laminated ferromagnetic member can keep high durability and corrosion resistance even under a high-temperature environment or a severe temperature-variation environment.

As described above, according to the present invention, many projecting portions are formed on the respective confronting faces of the pole face of the electromagnet and the ferromagnetic member, and thus the magnetic flux generated by the electromagnet is concentrated on the many projecting portions, so that the positional resolution of the attractive force or the repulsive force to the confronting ferromagnetic member is enhanced and thus the movement of the ferromagnetic member can be regulated and controlled with high precision.

BRIEF DESCRIPTION OF THE DRAWINGS

FIG. 5 is a front view of a rotating shaft.

FIG. 7 is frontal sectional view showing a second embodiment in which the magnetic levitation actuator of the present invention is applied to a linear motor.

BEST MODE FOR CARRYING OUT THE INVENTION

Preferred embodiments according to the present invention will be described with reference to the drawings.

First Embodiment

FIGS. 1 to 6C show a first embodiment in which a magnetic levitation actuator of the present invention is applied to a magnetic bearing.

Figure 1:
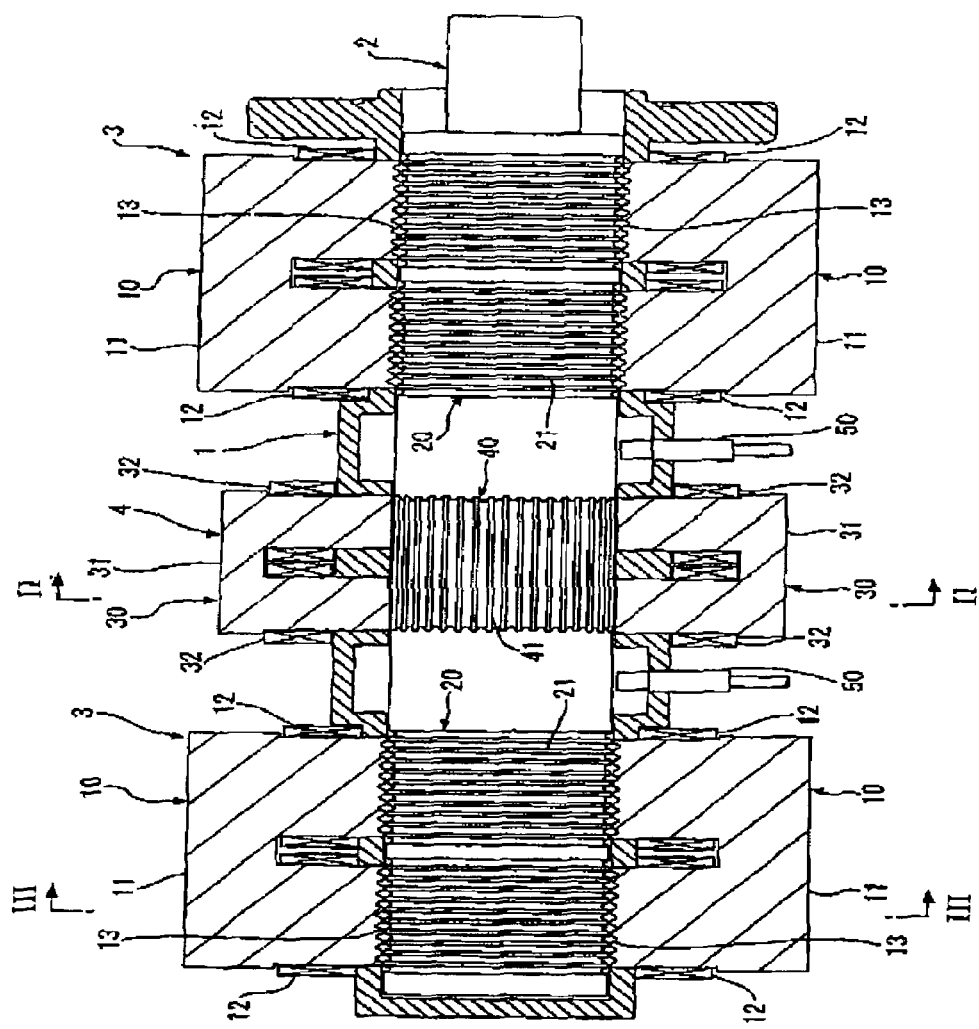
FIG. 1 is a functional sectional view showing a first embodiment in which a magnetic levitation actuator of the present invention is applied to a magnetic bearing.

A device shown in FIG. 1 is a rotational type motor device, and the main part thereof is constructed by a case 1, a rotating shaft 2 (driven member), a magnetic bearing 3 and a rotationally driving portion 4.

The inside of the case 1 is hollow (see FIG. 4), and a round-bar type rotating shaft 2 (driven member) is accommodated in the hollow portion of the case 1.

Figure 2:
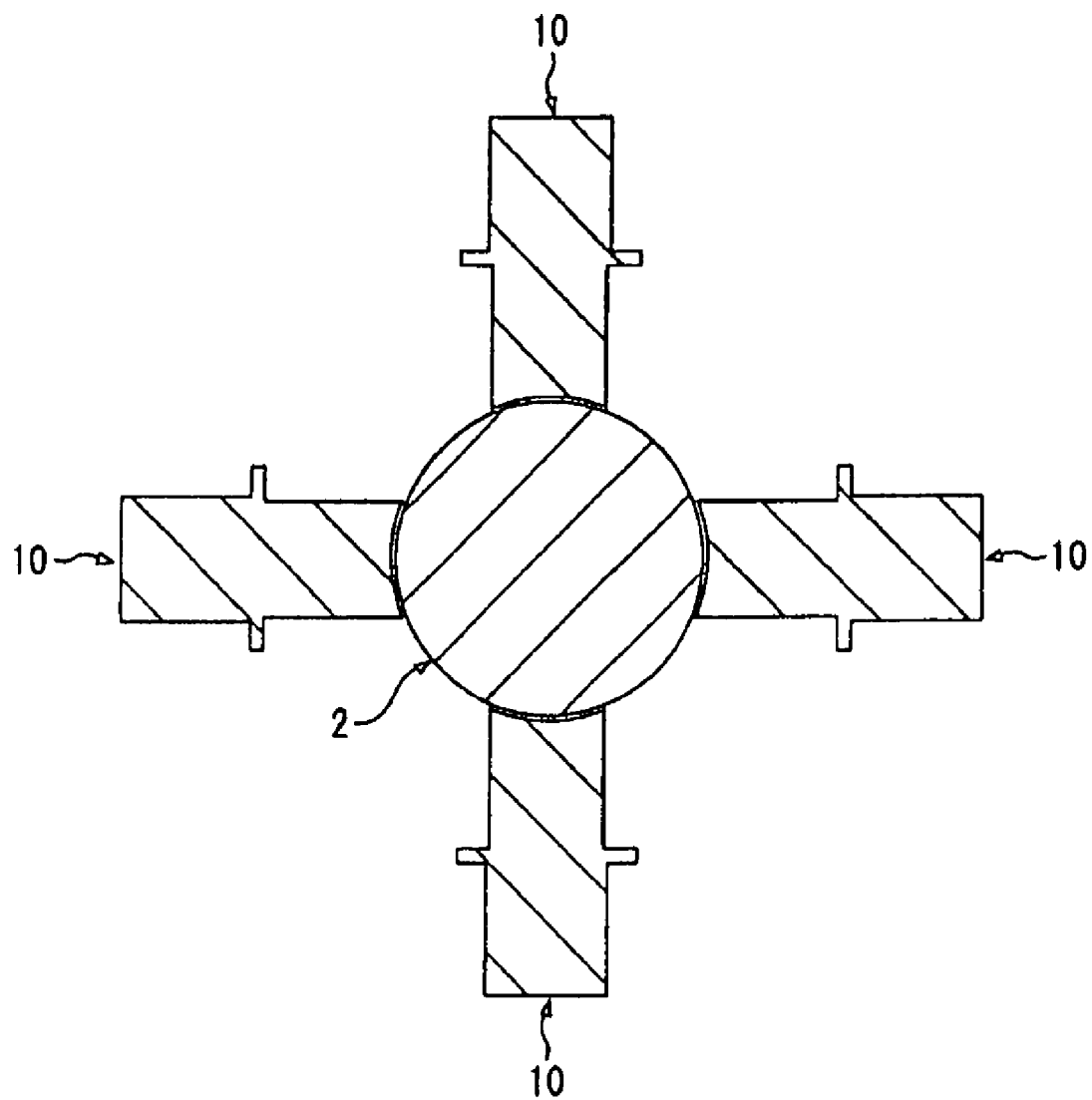
FIG. 2 is a cross-sectional view taken along line II-II of FIG. 1. The section of a case is omitted.

The magnetic bearing 3 freely rotatably supports the rotating shaft 2 in a non-contact style, and it is constructed by plural electromagnets 10 provided in the neighborhood of both the end portions of the case 1, and ferromagnetic portions 20 formed on the rotating shaft 2. The plural electromagnets are provided in the neighborhood of each of both the ends of the case 1 so as to be spaced from one another at a fixed interval in the peripheral direction. In this embodiment, four electromagnets 10 are provided so as to be angularly spaced from one another by 90° as shown in FIG. 2. Furthermore, in this embodiment, the rotating shaft 2 is formed of a ferromagnetic material, and a part thereof is processed as the ferromagnetic portions 20 corresponding to the constituent elements of magnetic bearings 3.

The electromagnet 10 is formed by winding a coil 12 around a U-shaped iron core 11. The end faces of the iron core 11 constitute pole faces 11a, 11b (see FIG. 4), and constitute a magnetic circuit in which magnetic flux generated when the coil 12 is supplied with current is emitted from one pole face 11a and returned to the other pole face 11b. The electromagnet 10 is provided to the outside of the case 1, and only the pole faces 11a, 11b are exposed to the inner peripheral surface of the case 1. Many minute projecting portions 13 are formed on each of the pole faces 11a, 11b so as to be arranged along the axial direction of the rotating shaft 2 and spaced from one another at a fixed interval (see FIGS. 1 and 4). Each projecting portion 13 extends in the inner peripheral direction of the case 1.

The ferromagnetic portions 20 formed on the rotating shaft face the pole faces 11a, 11b so as to be spaced from the pole faces 11a, 11b at slight intervals. Many minute projecting portions 21 are formed on the ferromagnetic portions 20 so as to be arranged along the axial direction of the rotating shaft 2 and spaced from one another at a fixed interval (see FIGS. 1 and 5). Each projecting portion 21 extends in the peripheral direction of the rotating shaft 2.

Figure 3:
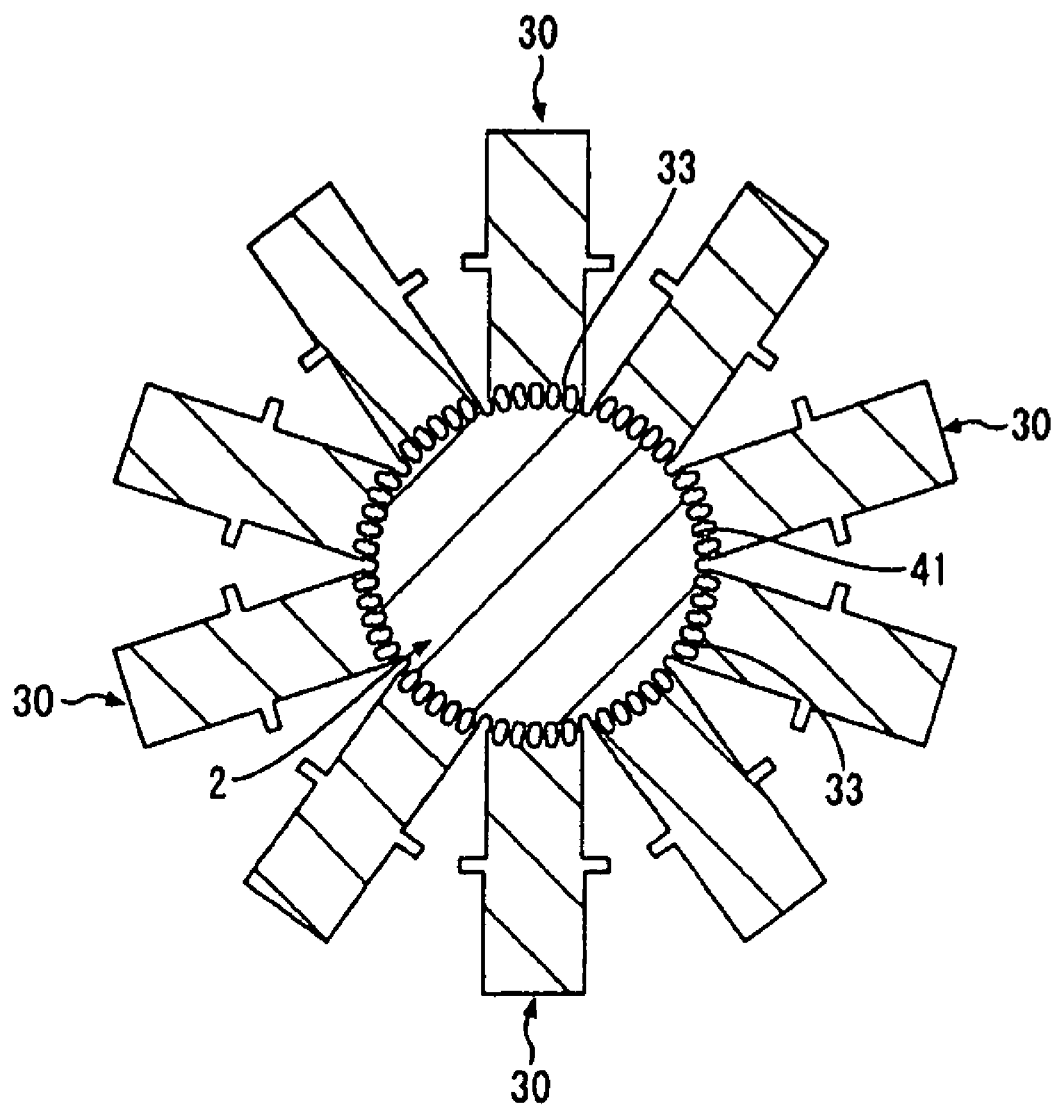
FIG. 3 is a cross-sectional view taken along a line III-III of FIG. 1. The section of the case is omitted.
Figure 4:
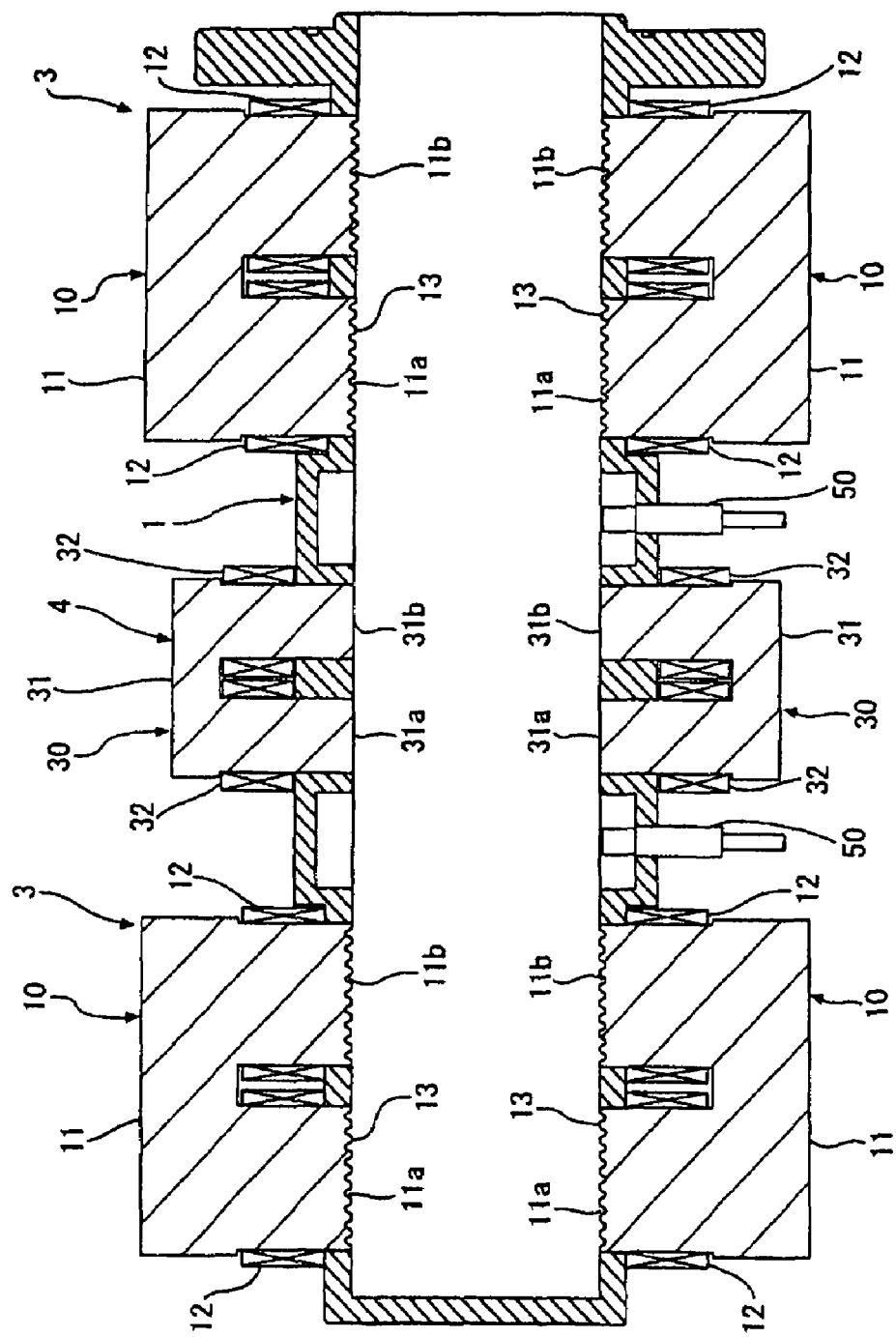
FIG. 4 is a frontal sectional view of the case.

The rotational driving portion 4 is provided at the intermediate portion sandwiched between the magnetic bearings 3 provided in the neighborhood of both the end portions of the case 1. The rotational driving portion 4 is constructed by plural electromagnets provided to the case 1 and a rotor portion 40 formed on the rotating shaft 2. As shown in FIG. 3, the plural electromagnets 30 are provided so as to be spaced from one another at a fixed interval in the peripheral direction of the case 1. In this embodiment, the rotor portion 40 is formed by processing a part of the rotating shaft 2 formed of a ferromagnetic material.

The electromagnet 30 is formed by winding a coil 32 around a U-shaped iron core 31 as in the case of the magnetic bearing 3. The end faces of the iron core 31 constitute pole faces 31a, 31b (see FIG. 4), and form a magnetic circuit in which magnetic flux generated when the coil 32 is supplied with current is emitted from one pole face 31a and returns to the other pole face 31b. The electromagnet 30 is provided to the outer portion of the case 1, and only the pole faces 31a, 31b are exposed to the inner peripheral surface of the case 1. Many minute projecting portions 33 are formed on each of the pole faces 31a, 31b so as to be arranged along the peripheral direction of the rotating shaft 2 and spaced from one another at a fixed interval (see FIG. 3). Each projecting portion 33 extends in the longitudinal direction of the case 1.

The rotor portion 40 formed on the rotating shaft 2 faces the pole faces 31a, 31b of the electromagnet 30 so as to be spaced from one another at a slight interval, and many minute projecting portions 41 are formed on the surface of the rotor portion 40 so as to be arranged in the peripheral direction of the rotating shaft 2 and spaced from one another at a fixed interval (see FIG. 1, FIG. 5). Each projecting portion 41 extends in the axial direction of the rotating shaft 2.

Non-contact sensors 50 for detecting the interval from the outer peripheral surface of the rotating shaft 2 (the interval in the radial direction) are provided at proper positions on the peripheral wall of the case 1. An eddy current sensor, a capacitance sensor, an optical sensor or the like may be applied as the non-contact sensors 50, for example.

Figure 6A:
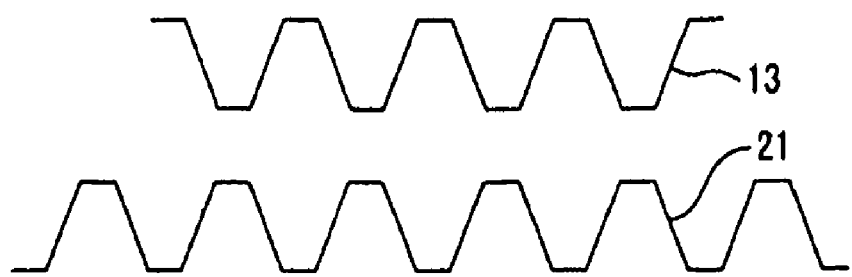
FIGS. 6A, 6B and 6C are diagrams showing the shape of projecting portions of the magnetic bearing and the operating principle.
Figure 6B:
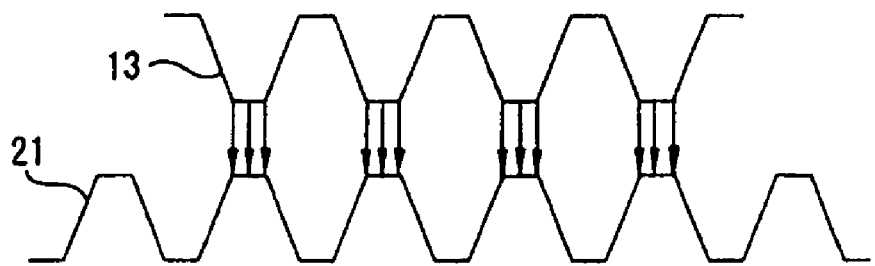
Figure 6C:
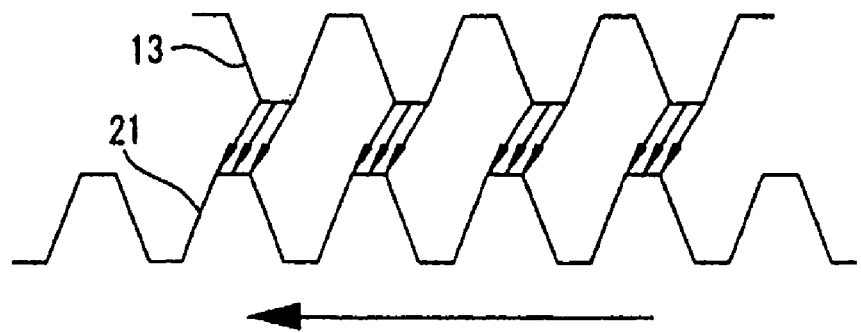

FIGS. 6A to 6C are diagrams showing the shape of the projecting portion of the magnetic bearing described above and the operation principle.

As shown in FIG. 6A, the projecting portions 13 formed on the pole face of the electromagnet 10 constituting the magnetic bearing 3 and the projecting portions 21 formed on the ferromagnetic portions 20 of the rotating shaft 2 are formed to have the same shape and be spaced from one another at an equal interval. These projecting portions 13, 21 are designed so that the cross-sectional area thereof is smaller toward the tips thereof (that is, trapezoidal shape). This shape of the projecting portions 13, 21 is set on the basis of embodiments described later which have been implemented by the inventors.

As shown in FIG. 6B, the magnetic flux generated by the electromagnet 10 flows from the tip of each projecting portion 13 formed on one pole face 11a to the tip of each projecting portion 21 of the confronting ferromagnetic portion 20. As not shown, the magnetic flux entering each projecting portion 21 of the ferromagnetic portion 20 passes through the ferromagnetic portion 20 and returns from the tip of each projecting portion 21 of the ferromagnetic portion 20 facing the other pole face 11b to each projecting portion 13 formed on the other pole face 11b, thereby forming a magnetic circuit. In this magnetic circuit, the attractive force in the radial direction by the magnetic flux acts between each projecting portion 13 formed on the pole faces 11a, 11b and each projecting portion 21 of the ferromagnetic portion 20 facing each projecting portion 13. The magnetic bearing 3 has plural electromagnets 10 which are spaced from one another at a fixed interval (in this embodiment, an angular interval of 90°) in the peripheral direction, and each electromagnet 10 is controlled by a control circuit (not shown) so that the rotating shaft is supported to be magnetically floated. Here, the control circuit calculates a current value to flow into the coil 12 on the basis of a detection signal from the non-contact sensor 50, and controls each magnetic bearing on the basis of the calculated current value.

Furthermore, when the rotating shaft 2 moves in the axial direction, there occurs a displacement in relative position between each projecting portion 13 formed on the pole faces 11a, 11b of the electromagnet 10 and each projecting portion 21 formed on the ferromagnetic portion 20 of the rotating shaft 2, and the gap between these projecting portions 12, 21 is increased. On the other hand, the magnetic flux occurring from the electromagnet 10 acts on the ferromagnetic portions 20 of the rotating shaft 2 as attractive force in a direction along which the interval between the respective projecting portions 13, 21 is reduced, that is, in a direction (axial direction) along which the rotating shaft 2 is returned to the original position.

Here, the magnetic flux generated from the electromagnet 10 concentrates on the many projecting portions 13, and thus restoring force in the axial direction occurs while suppressing reduction of the attractive force acting in the radial direction on the ferromagnetic portions 20. Therefore, the movement of the rotating shaft 2 can be regulated with high precision. That is, according to the magnetic bearing 3 of this embodiment, the rotating shaft 2 as the driven member can be supported not only in the radial direction, but also in the axial direction. Accordingly, it is unnecessary to provide a thrust block for regulating the movement of the rotating shaft 2 in the axial direction, and thus miniaturization, reduction in cost and facilitation of the control can be performed.

The rotational driving portion 4 constitutes a so-called stepping motor, and proper current control is executed on the plural electrodes 30, whereby the rotating shaft 2 is rotationally driven by magnetic flux.

Second Embodiment

FIG. 7 shows a second embodiment in which the magnetic levitation actuator of the present invention is applied to a linear motor.

The linear motor shown in FIG. 7 is mainly constructed by a case 1, a driven member 2, and a magnetic driving portion 5 for moving the driven member in the axial direction. In FIG. 7, a magnetic bearing for magnetically floating the driven member 2 is omitted.

The inside of the case 1 is hollow, and the driven member is accommodated in the hollow portion of the case 1. The driven member 2 is freely movable in the longitudinal direction in the case 1.

The magnetic driving portion 5 is constructed by electromagnets 60 provided to the peripheral wall of the case 1, and a ferromagnetic portion 20 formed on the driven member 2. Furthermore, in this embodiment, the driven member 2 is formed of a ferromagnetic material, and substantially the whole of the driven member 2 forms a ferromagnetic portion 20.

Plural columns (three columns in FIG. 7) of electromagnets 60 are provided so as to be arranged at a fixed interval in the movement direction of the driven member 2, that is, in the longitudinal direction of the case 1. As is not clear in the figure, the electromagnet 60 is formed by winding a coil (not shown) around a U-shaped iron coil 61. Each end face of the iron core 61 constitutes a pole face, and the pole faces are arranged so as to be align in the peripheral direction of the case 1. By supplying current to the coil, magnetic flux occurs in the iron core 61, and it emits from one pole face and returns to the other pole face, thereby forming a magnetic circuit. The electromagnets 60 are provided to the outside of the case 1 and only the pole faces are exposed to the inner peripheral surface of the case 1. Many minute projecting portions 62 are formed on each pole face so as to be spaced from one another at a fixed interval and arranged in the movement direction of the driven member 2 (i.e., in the longitudinal direction). Each projecting portion extends in the inner peripheral direction of the case 1.

The ferromagnetic portion 20 formed on the driven member 2 faces the pole faces of the electromagnets 60 so as to be spaced from each pole face at a slight interval, and many minute projecting portions 21 are formed on the surface of the ferromagnetic portion 20 so as to be spaced from one another at a fixed interval and arranged in the movement direction of the driven member 2. Each projecting portion 21 extends in the peripheral direction of the driven member 2.

FIGS. 8A to 8D are diagrams showing the shape and formation pitch of the projecting portions of the magnetic driving portion described above and the operation principle.

Figure 8A:
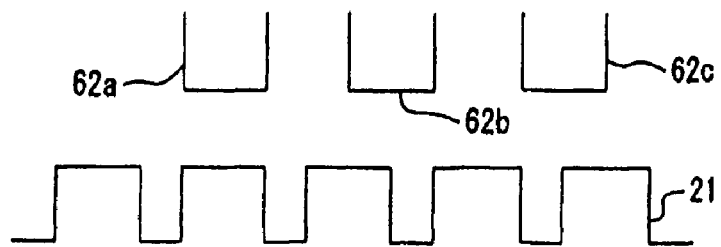
FIGS. 8A, 8B, 8C and 8D are diagrams showing the shape and formation pitch of projecting portions of a magnetic driving portion, and the operating principle.

As shown in FIG. 8A, projecting portions 62 formed on the pole face of the electromagnet 60 constituting the magnetic driving portion 5 and projecting portions 21 formed on the ferromagnetic portion 20 of the driven member 2 are formed to have the same shape. These projecting portions 62, 21 are shaped to have a rectangular longitudinal section. The shape of the projecting portions 62, 21 is set on the basis of an embodiment described later which is implemented by the inventors.

The many projecting portions 21 formed on the driven member 2 are formed so as to be arranged and spaced from one another at a fixed interval. The pole faces of the plural electromagnets 60 are displaced from one another so that the phase of the projecting portions 62 formed on each pole face is returned to the original one at any period. In this embodiment, as shown in FIG. 8A, many projecting portions 62a, 62b, 62c formed on the respective electromagnets 60 of three columns are configured so as to be displaced with respect to the projecting portions 21 formed on the driven member 2 by ⅓ in phase every electromagnet. The respective projecting portions 62 formed on the same pole face are aligned with one another at an equal interval.

Figure 8B:
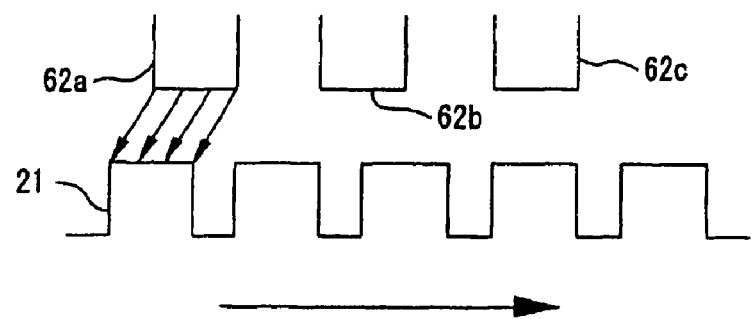
Figure 8C:
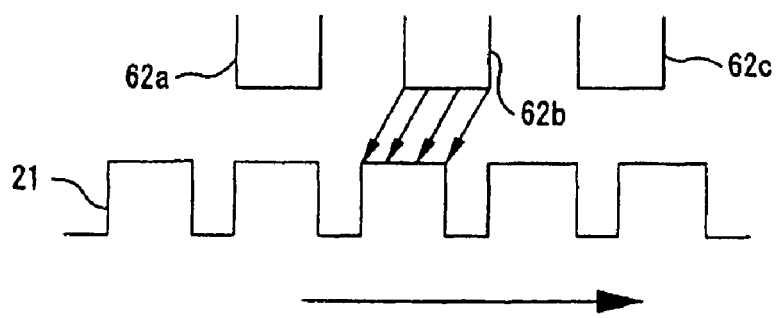
Figure 8D:
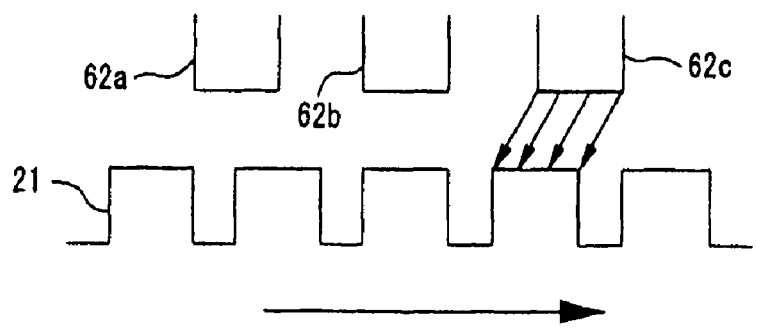

Current supply to the coils of the electromagnets 60 of the three columns is controlled as shown in FIGS. 8B to 8D, for example. First, when current is supplied to the electromagnet 60 of the first column, magnetic flux is emitted from the projecting portions 62a formed on the pole face of the iron core 61 of the electromagnet 60 concerned, and flows to the nearest projecting portions of the ferromagnetic portion 20. The attractive force caused by the magnetic flux acts between the projecting portions 62a and 21, and the projecting portions 21 of the ferromagnetic portion 20 is moved so as to face the projecting portions 62a formed on the pole face of the iron core 61 of the electromagnet 60 by the attractive force (FIG. 8B). Subsequently, when the current supply to the electromagnet 60 of the first column is stopped and current is supplied to the electromagnet 60 of the second column, magnetic flux is emitted from the projecting portions 62b formed on the pole face of the iron core 61 of the electromagnet 60 concerned, and flows to the nearest projecting portions 21 of the ferromagnetic portion 20. At this time, the attractive force caused by the magnetic flux acts between these projecting portions 62b and 21, and the projecting portions 21 of the ferromagnetic portion 20 are moved so as to face the projecting portions 62b formed on the pole face of the iron core 61 of the electromagnet 60 by the attractive force (FIG. 8C). Subsequently, when the current supply to the electromagnet 60 of the second column is stopped and current is supplied to the electromagnet 60 of the third column, magnetic flux is emitted from the projecting portions 62c formed on the pole face of the iron core 61 of the electromagnet 60 and flows to the nearest projecting portions 21 of the ferromagnetic portion 20. The attractive force caused by the magnetic flux acts between the projecting portions 62c and 21, and the projecting portions 21 of the ferromagnetic portion 20 are moved so as to face the projecting portions 62c formed on the pole face of the iron core 61 of the electromagnet 60 (FIG. 8D). As described above, the driven member 2 can be moved under a floated state.

Here, the magnetic flux occurring in the electromagnet 60 concentrates on the many projecting portions 62, and thus the positional resolution of the attractive force to the ferromagnetic portion 20 is enhanced. Therefore, the movement of the driven member 2 can be controlled with high precision.

[Modification]

Figure 9:
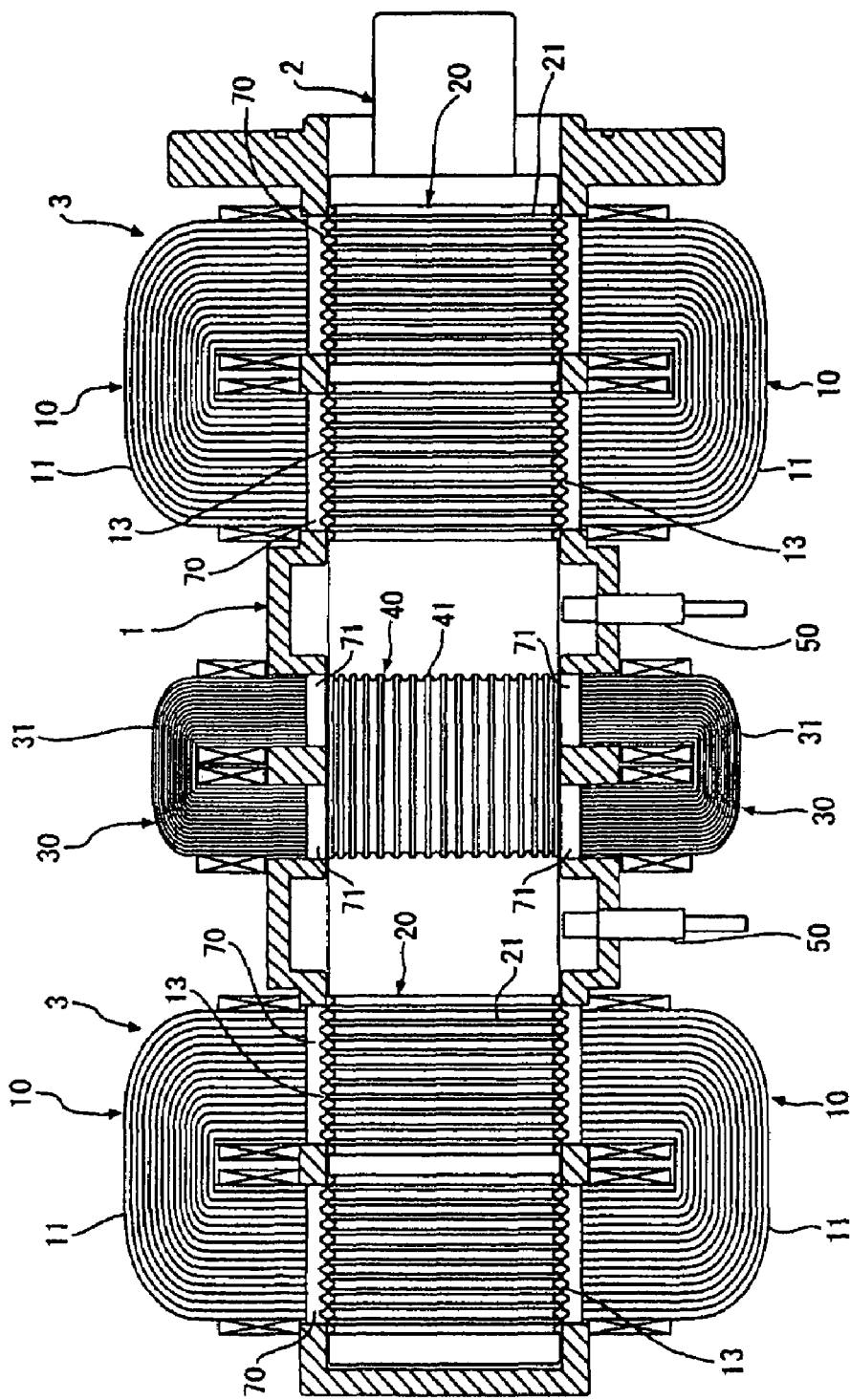
FIG. 9 is a diagram showing a modification of a magnetic bearing according to a first embodiment.

FIG. 9 is a diagram showing a modification of the magnetic levitation actuator according to the first embodiment.

In this embodiment, the iron core 11 of the electromagnets 10 constituting the magnetic bearings 3 and the iron core 31 of the electromagnet 30 constituting the rotational driving portion 4 are formed of laminated steel plates. When this type of electromagnets are used, it is preferable that thin plates formed of non-laminated ferromagnetic materials 70, 71 are attached to the end faces (pole faces) of the iron cores 11, 31 of the electromagnets and the non-laminated ferromagnetic materials 70, 71 are exposed to the inner peripheral surface of the case 1.

Particularly when the magnetic levitation actuator of this embodiment is applied to a vacuum motor, it is necessary to keep the inside of the case 1 under a vacuum environment. According to the above construction, the electromagnets are disposed at the outside of the case 1, and thus even when the iron cores 11, 31 constituting the electromagnets 10, 30 are formed of laminated steel plates, the magnetic levitation actuator is not affected by gas discharged from the laminated steel plates and thus the inside of the case 1 can be kept under the high vacuum state.

It is needless to say that the above construction is applicable to the linear motor according to the second embodiment.

Stainless steel (electromagnetic stainless steel) to which numbers from 400 to 499 of JIS are assigned is suitably used for the non-laminated ferromagnetic materials 70, 71 forming the thin plates attached to the end faces of the iron cores 11, 31. In place of these materials, pure iron, steel, alloy such as permendurs (Fe50/Co50) or the like, ferrite or the like may be used. However, the electromagnetic stainless steel is most preferable because it has high magnetic permeability, high corrosion resistance, excellent eddy current characteristic and low gas adsorption capability.

Figure 10:
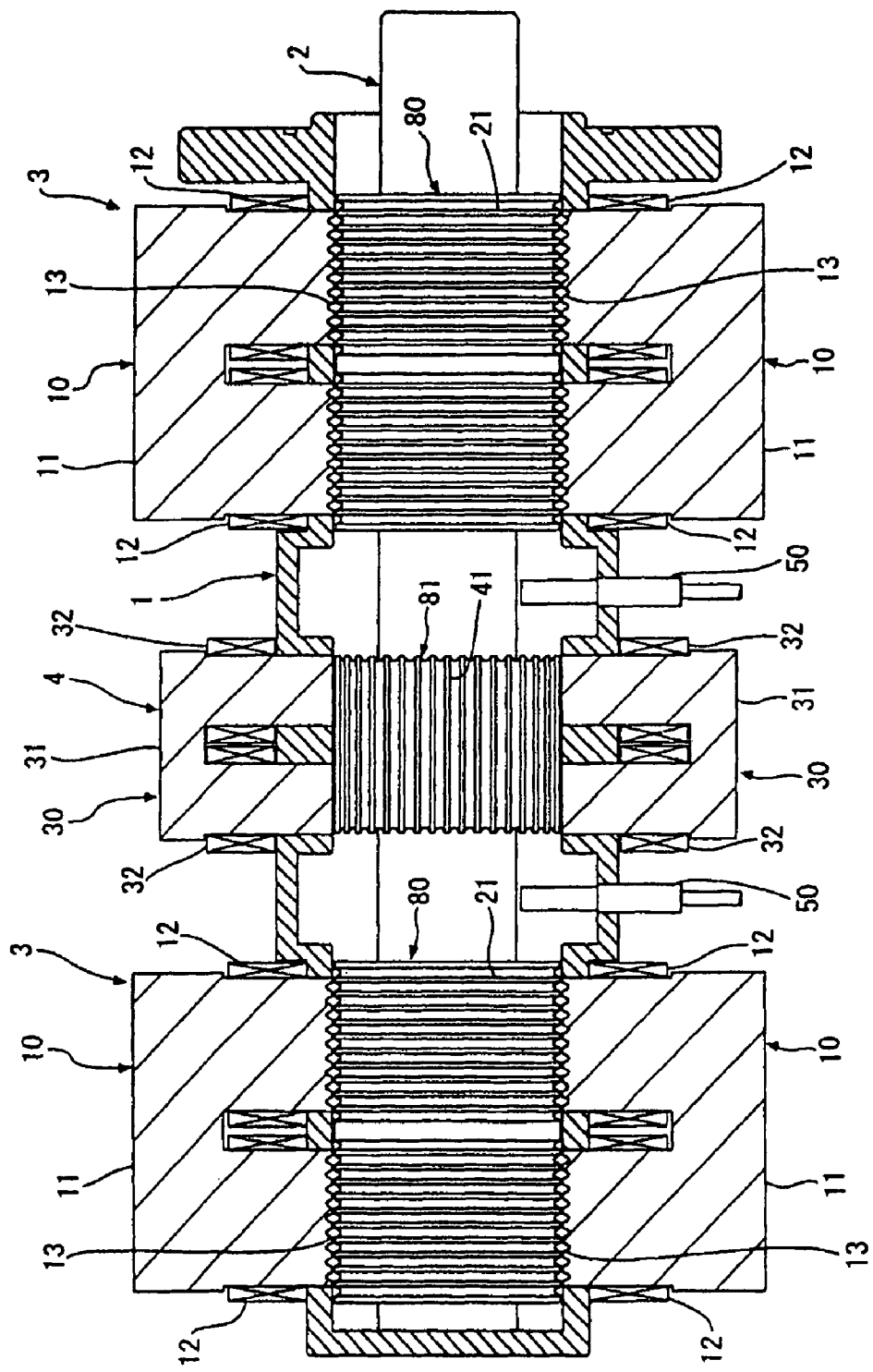
FIG. 10 is a diagram showing another modification of the magnetic bearing according to the first embodiment.

FIG. 10 is a diagram showing another modification of the magnetic levitation actuator according to the first embodiment.

As shown in FIG. 10, the rotating shaft 2 (driven member) is formed of non-magnetic material, and annular members 80, 81 formed of ferromagnetic material are fitted to the rotating shaft 2. The projecting portions 21, 41 described above are formed on the annular members 80, 81. As described above, since the rotating shaft 2 is formed of non-magnetic material, the annular members 80, 81 (ferromagnetic material) can be magnetically shielded. Accordingly, leakage of magnetic flux can be suppressed and the magnetic force can be strengthened.

The present invention is not limited to the embodiments and the modifications described above.

For example, if the ferromagnetic material is changed from material having high magnetic permeability to material having high holding force, that is, permanent magnet, the magnetic force occurring in the electromagnet acts on the permanent magnet as repulsive force or strong attractive force. The movement of the driven member can be regulated or controlled by using this force.

In this specification, the "ferromagnetic material" contains material representing ferromagnetism under the exciting state of the electromagnet, for example, iron or electromagnetic stainless steel.

EXPERIMENT EXAMPLES

Figure 11:
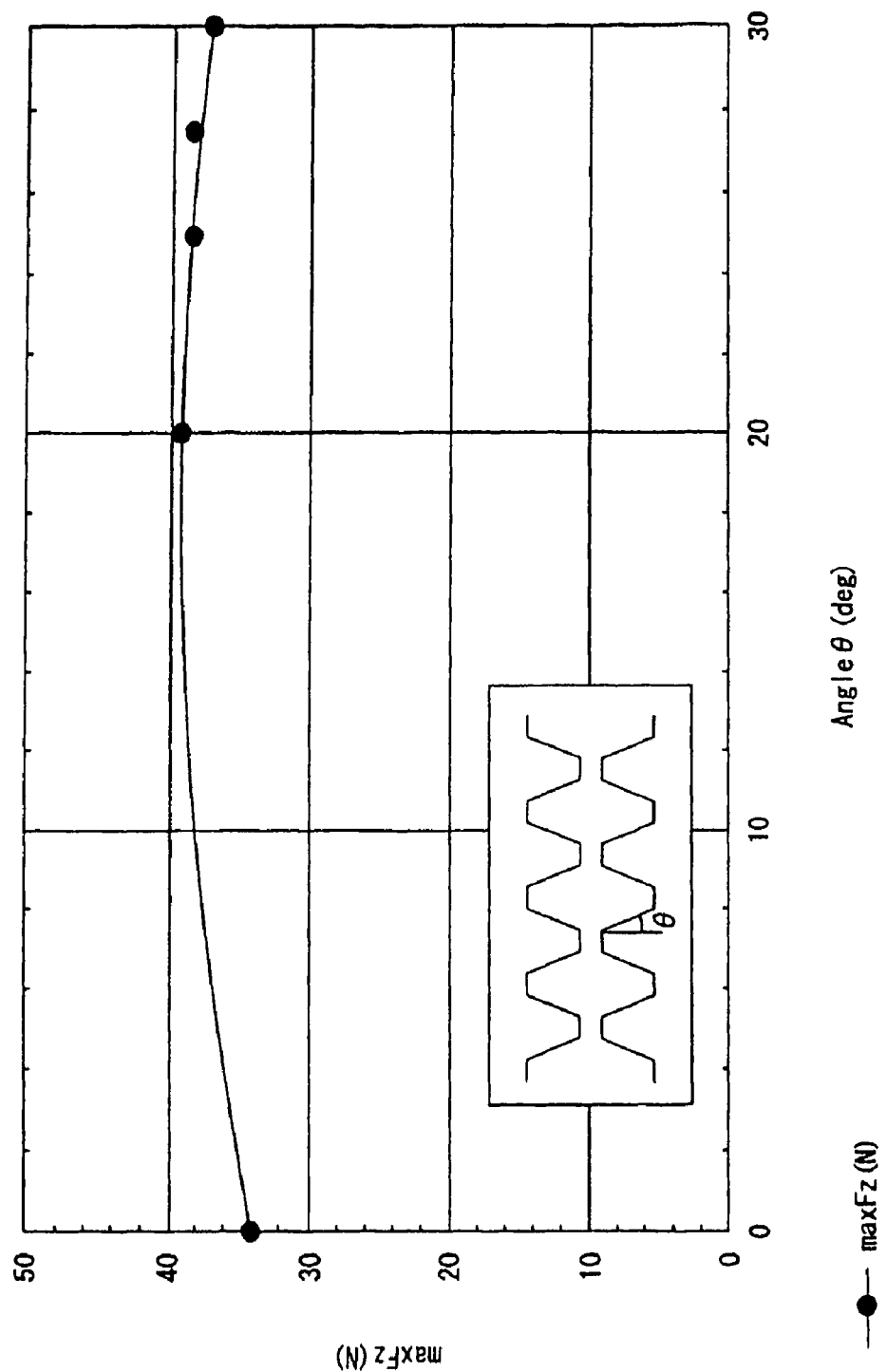
FIG. 11 is a diagram showing data of experiments carried out to determine a suitable projecting-portion shape for the magnetic bearing.

FIG. 11 is a diagram showing data of an experiment executed to determine a suitable shape of the projecting portions for the magnetic bearing. The experiment used a method of forming projecting portions of about 1 mm in depth, suitably changing the inclination angle θ of both the side surfaces and measuring the attractive force occurring between the confronting projecting portions. As a result of the experiment, when the inclination angle θ of both the side surfaces was set to about 20°, the largest attractive force occurred. From this experiment result, it is preferable that the projecting portions are formed so as to have a trapezoidal shape of about 20° for the construction of regulating the movement of the magnetic bearing or the like.

Figure 12:
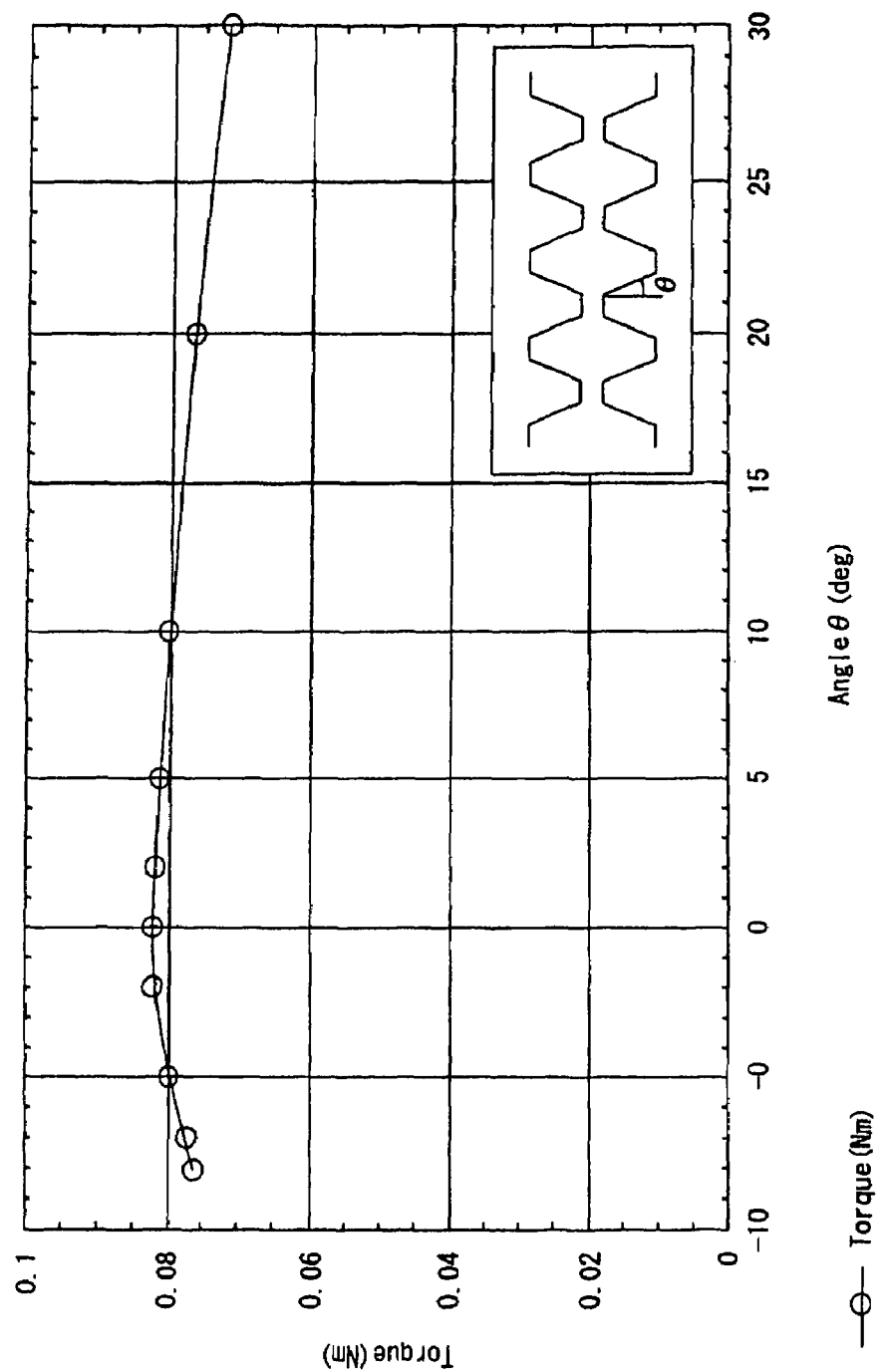
FIG. 12 is a diagram showing data of experiments carried out to determine a suitable projecting-portion shape for the linear motor.

FIG. 12 is a diagram showing data of an experiment executed to determine a suitable shape of the projecting portions for a linear motor. This experiment used a method of forming projecting portions of about 1.2 mm in depth, suitably changing the inclination angle θ of both the side surfaces thereof and measuring torque occurring between the confronting projecting portions. As a result of the experiment, when the inclination angle θ of both the side surfaces was set to 0°, that is, the projecting portions were designed to have a rectangular section, the largest torque occurred. From this experiment result, it is preferable that the projecting portions are designed to have a rectangular section for the construction of controlling the driving of the linear motor or the like.

INDUSTRIAL APPLICABILITY

As described above, according to this invention, many projecting portions are formed on the respective confronting surfaces of the pole face of the electromagnet and the ferromagnetic member. Therefore, the magnetic flux occurring in the electromagnet concentrates on the many projecting portions, so that the positional resolution of the attractive or repulse force to the confronting ferromagnetic member is enhanced, and the movement regulation and movement control of the ferromagnetic member can be performed with high precision.

The invention claimed is:

1. A magnetic levitation actuator comprising an electromagnet and a ferromagnetic member provided so as to face a pole face of the electromagnet under a non-contact state, wherein many projecting portions are formed on respective confronting faces of the pole face of the electromagnet and the ferromagnetic member; and
wherein said electromagnet is a driving member, and the driving member is accommodated in a case, the electromagnet contains an iron core mounted on an outer portion of the case and a magnetic coil wound around the iron core, an end face of the iron core constitutes a pole face, the end face of the iron core concerned is formed of a non-laminated ferromagnetic member and the non-laminated ferromagnetic member is exposed to an inner surface of the case so as to serve as a part of an inner wall of the case.

2. The magnetic levitation actuator according to claim 1, wherein the ferromagnetic member is provided to a driven member, the many projecting portions are arranged in a direction along which the movement of the driven member is required to be regulated, and the driven member is supported by the electromagnet and the ferromagnetic member under a non-contact state.

3. The magnetic levitation actuator according to claim 2, wherein each of the projecting portions is configured so that the cross-sectional area thereof is smaller toward a tip thereof.

4. The magnetic levitation actuator according to claim 1 in which a driven member is driven under the non-contact state by the electromagnet and the ferromagnetic member, characterized in that the following first to third requirements are satisfied:
first, the electromagnet includes plural electromagnets provided, and the respective electromagnets are arranged in a direction along which the driven member is required to be moved;
secondly, the ferromagnetic member is provided to the driven member; and
thirdly, the pole faces of the plural electromagnets are displaced so that the phase of the projecting portions formed on the respective poles is returned to an original phase at any period.

5. The magnetic levitation actuator according to claim 4, wherein each projecting portion is configured to have a rectangular longitudinal section.

6. A magnetic levitation actuator comprising:
an electromagnet having an iron core and a magnetic coil wound around the iron core, the electromagnet having an electromagnet pole face constituted by an end face of the iron core and having first plural projections extending in a field direction of the pole face so as to simultaneously emit in common a flux of a magnetic field of the electromagnet generated by the magnetic coil;
a ferromagnetic member having second plural projections extending toward the first plural projections of the electromagnet;
a driving assembly including said electromagnet;
a driven member formed at least in part by the ferromagnetic member, and the driven member being driven by the driving assembly to move in a movement direction relative to the driving assembly;
the electromagnet pole face and the ferromagnetic member being disposed to face each other without contacting each other such that magnetic interaction of the electromagnet pole face and the ferromagnetic member suspends the driven member in a non-contact state to effect levitation of the driven member relative to the driving member;
the driving assembly including a case incorporating the electromagnet, the case having an inner wall defining a case interior enclosing at least a portion of the ferromagnetic member;
the iron core having a first portion having said magnetic coil wound thereon, the first portion being mounted on an outer portion of the case; and
the end face of the iron core, forming said electromagnetic pole face, being exposed to the interior the case and forming a part of an inner wall of the case.

7. The magnetic levitation actuator according to claim 6, the first and second plural projections are respectively arranged adjacent each other along a restriction direction in which movement of the driven member relative to the driving assembly is restricted by the magnetic interaction of the electromagnet and the ferromagnetic member suspending the driven member relative to the driving assembly in the non-contact state, the restriction direction being orthogonal to the movement direction of the driven member relative to the driving member.

8. The magnetic levitation actuator according to claim 7, wherein the movement direction is circumferential movement effected by rotation of the driven member about an axis and the restriction direction is an axial direction of said axis.

9. The magnetic levitation actuator according to claim 8, further comprising driving electromagnets supported by said case and having driving pole faces, said driven member including a flux transmitting area opposing said driving pole faces and arranged to interact with said driving poles such that successive activation of said driving magnets effects said circumferential movement by rotation of said driven member about said axis.

10. The magnetic levitation actuator according to claim 9, wherein said driving pole faces each include plural driving projections extending in a field direction of the driving pole faces, and the flux transmitting area includes plural flux transmitting projections extending radially outward.

11. The magnetic levitation actuator according to claim 10, wherein said first and second projections are configured to have rectangular cross sections taken in a direction orthogonal to the field direction of the driving pole faces, and the rectangular cross sections have a longitudinal direction extending orthogonal to said axis.

12. The magnetic levitation actuator according to claim 11, wherein said plural driving projections and said plural flux transmitting projections are configured to have rectangular cross sections taken in a direction orthogonal to the field direction of the driving pole faces, and the rectangular cross sections have a longitudinal direction extending parallel to said axis.

13. The magnetic levitation actuator according to claim 8, wherein the driven member includes a non-magnetic shaft portion upon which the ferromagnetic member is supported such that flux is concentrated in the ferromagnetic member.

14. The magnetic levitation actuator according to claim 8, wherein the iron core is formed of a non-laminated ferromagnetic member and the non-laminated ferromagnetic member is exposed to the interior of the case so as to form the part of the inner wall of the case.

15. The magnetic levitation actuator according to claim 7, wherein the movement direction is a linear direction along an axis and the restriction direction is orthogonal to the linear direction.

16. The magnetic levitation actuator according to claim 15, wherein:
 the electromagnet includes plural electromagnets each having said first projections, and respective ones of the plural electromagnets are disposed successively along the movement direction; and
 the plural electromagnets are displaced relative each other such that respective ones of the pole faces of each of the plural electromagnets are displaced relative adjacent ones of the pole faces so that the first projections of successive ones of the plural electromagnets are shifted relative the first projections of another one of the plural magnets a portion of a pitch distance of the first projections determined by a number n of the plural electromagnets present such that successive n operations of the plural electromagnets result in displacing the driven member the pitch distance of the first projections by successive movements of the portion of the pitch distance corresponding to a phase of the pitch distance of the first projections.

17. The magnetic levitation actuator according to claim 16, wherein each of the first and second projections are configured so that a cross-sectional area extending orthogonal to the field direction is smaller toward ends of the first and second projections than at bases of the first and second projections.

18. The magnetic levitation actuator according to claim 17, wherein said first and second projections are configured to have a rectangular cross sections taken in a direction orthogonal to the field direction of the driving pole faces, the rectangular cross sections having a longitudinal direction extending orthogonal to said axis.

19. The magnetic levitation actuator according to claim 16, wherein said first and second projections are configured to have a rectangular cross sections taken in a direction orthogonal to the field direction of the driving pole faces, the rectangular cross sections having a longitudinal direction extending orthogonal to said axis.

20. The magnetic levitation actuator according to claim 16, wherein the driven member includes a non-magnetic portion upon which the ferromagnetic member is supported such that flux is concentrated in the ferromagnetic member.

21. The magnetic levitation actuator according to claim 16, wherein the iron core is formed of a non-laminated ferromagnetic member and the non-laminated ferromagnetic member is exposed to the interior of the case so as to form the part of the inner wall of the case.

* * * * *